United States Patent Office 2,722,547
Patented Nov. 1, 1955

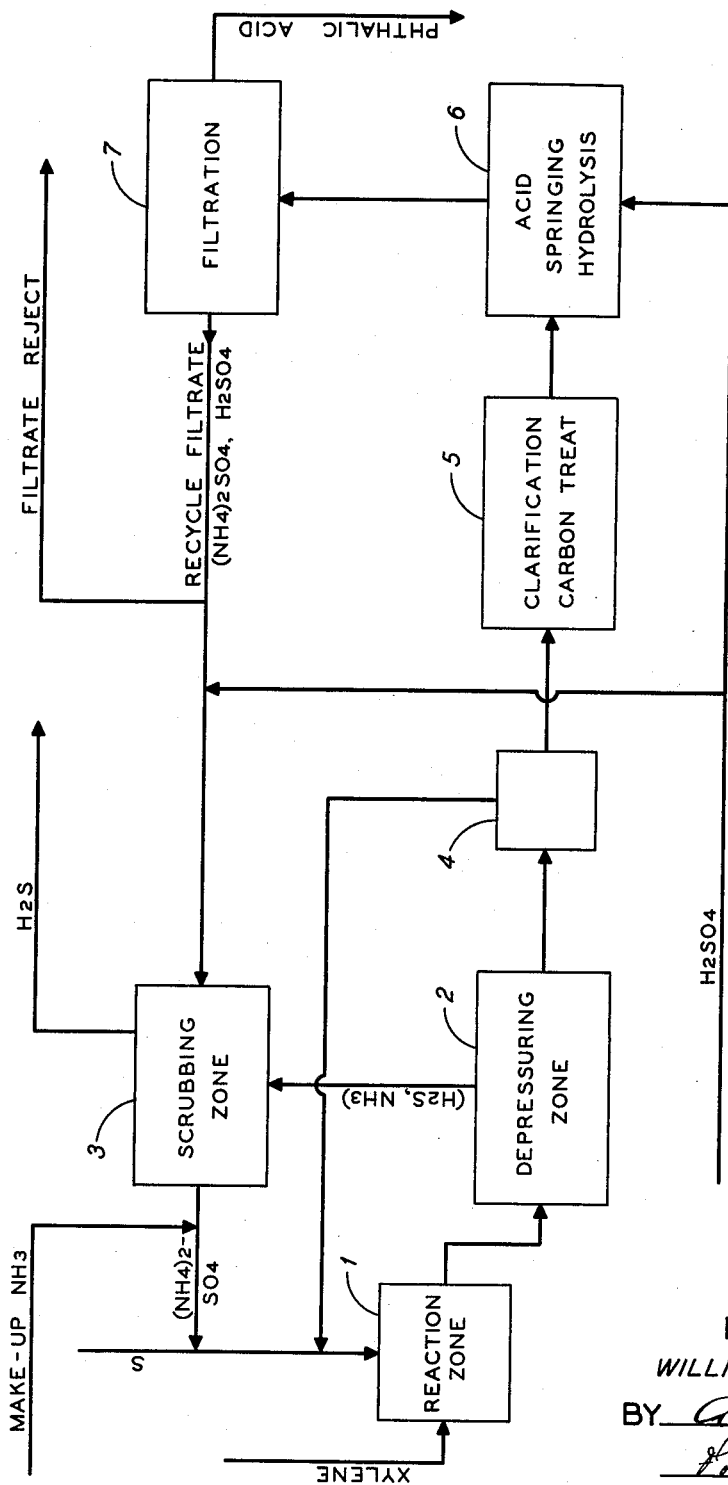

2,722,547
OXIDATION OF ORGANIC COMPOUNDS

William G. Toland, Jr., San Rafael, Calif., assignor to California Research Corporation, San Francisco, Calif., a corporation of Delaware Application December 28, 1951, Serial No. 263,953

11 Claims. (Cl. 260—524)

This invention relates to a process for oxidizing organic compounds. This application is a continuation-in-part of my application Serial No. 202,389, filed December 22, 1950.

Pursuant to the invention, an organic compound, a sulfate, sulfur and water are introduced into a reaction zone and there heated to an elevated temperature above about 400° F. to effect oxidation of the organic compound.

On the basis of experimental tests with a wide variety of organic compounds, it appears that all organic compounds undergo oxidation when treated in this manner. Organic compounds containing at least one carbon-to-carbon bond and at least one carbon-to-hydrogen bond are quite rapidly and completely converted to oxidation products. In particular, hydrocarbons and oxygen-containing partially-oxidized hydrocarbons are rapidly oxidized to organic carboxylic acids and organic carboxylic derivatives by the process of the invention. Aliphatic hydrocarbons, aromatic hydrocarbons, aldehydes, ketones, esters, ethers, organic acids, amines, amides, and heterocyclic organic compounds are readily oxidized by the process of the invention.

Any sulfate may be employed in the oxidation process, but it is preferred to employ water-soluble sulfates whose cations combine with sulfide ion to form water-soluble salts. Sulfates such as ammonium sulfate, alkalie metal sulfates, the water-soluble alkaline earth metal sulfates, the alkali and alkaline earth metal hydrogen sulfates and sulfuric acid meet this requirement. Of the several preferred sulfates, ammonium sulfate has been found to be substantially more effective than the metallic sulfates and, by its use, optimum conversions and yields are obtained under any fixed set of reaction conditions. It is believed that ammonia liberated from ammonium sulfate during the reaction tends to solubilize hydrocarbon feeds and thus increase the intimacy of contact of the reactants.

The sulfur may be any physical form of elemental sulfur and is most conveniently introduced into the reaction zone in liquid state.

The oxidation reaction is conducted at temperatures ranging from 400° F. to the critical temperature of water. Temperatures above 700° F. are not usually employed and temperatures from 450° F. to 650 F. are preferred.

The oxidation reaction is conducted at an elevated temperature sufficient to maintain a part of the water introduced into the reaction zone in liquid phase. Pressures are usually in the range from 500 to 5000 p. s. i. g. and more commonly in the range from 1500 to 3500 p. s. i. g.

The rapidity and completeness of the oxidation reaction increase with temperature and the completeness of the oxidation of the organic compound at any given temperature tends to increase with time. Different types of organic compound differ in their susceptibility to attack by the oxidizing agents of the invention. For example, olefinic hydrocarbons are more readily oxidized than aromatic hydrocarbons. The extent of the oxidation of an organic compound of any given type may be controlled by varying time, the ratio of the reactants, and the temperature of reaction within the temperature range set out above. For example, at temperatures from 500 to 650° F. for periods of one-half hour to six hours, substantial amounts of partially-oxidized products will be found in the reaction product mixture; at higher temperatures and longer times more or all of the carbon contained in the organic compound can be converted to carbon dioxide.

The oxidation may be conducted either batch-wise or in a continuous manner. When batch operation is employed, the organic compound, the sulfate, the sulfur and the water are introduced into a bomb or an autoclave which is then sealed and heated to reaction temperature with shaking to facilitate contact of the reactants. The size of the bomb is so related to the quantity of the reactants introduced that an autogenous pressure sufficient to maintain a part of the water in liquid phase is built up. After the reactants have been held at reaction temperature for a time sufficient to effect the desired degree of oxidation of the organic compound, the bomb is cooled, depressured, and the reaction product is removed. The reaction may also be run continuously, in which case a tubular reaction zone is employed. The reactants are passed through an elongated tube, heated at reaction temperature and under an elevated pressure, and the reaction products are continuously withdrawn from the reaction zone and purified.

The appended drawing illustrates a preferred modification of the process of the invention. In starting the reaction a xylene, ammonium sulfate, sulfur and water are introduced into reaction zone 1. The reactants are heated in reaction zone 1 to a temperature of 600° F. for a time sufficient to effect partial oxidation of the xylene, for example, for a period of 15 minutes to 2 hours. The reaction product is removed from reaction zone 1 either intermittently or continuously and charged to cooling and depressing zone 2. The reaction mixture in zone 2 is depressured and the reaction product gases comprising ammonia and hydrogen sulfide are passed into scrubbing zone 3 where the gas is scrubbed with sulfuric acid to remove amomnia and form ammonium sulfate. The liquid product is removed from zone 2 and passed through filter 4 where free sulfur is filtered from the product. The free sulfur is returned to reaction zone 1 for use in oxidizing further quantities of xylene. The filtrate from filter 4 is passed into clarification zone 5 where it is mixed with a small quantity of adsorbent charcoal and filtered to remove any color bodies which may have been formed. The filtrate from zone 5 is passed into hydrolysis zone 6 where it is treated with a strong acid, preferably sulfuric acid, and heated to hydrolyze acid amides and to liberate free phthalic acids from the ammonium phthalates contained in the filtrate. The acidified liquid product is passed from zone 6 to filtration zone 7 where it is filtered to remover a filter cake comprising phthalic acids. A part of the filtrate from zone 7, usually the major part comprising ammonium sulfate and sulfuric acid is passed into scrubbing zone 3. From scrubbing zone 3 aqueous ammonium sulfate is withdrawn and returned to reaction zone 1. Make-up ammonia is introduced into the ammonium sulfate solution en route from scrubbing zone 3 to reaction zone 1. The proportions of fresh ammonia, scrubbed ammonia and sulfuric acid are adjusted to yield an approximately neutral soltuion of ammonium sulfate for introduction into reaction zone 1. Part of the hydrogen sulfide gas effluent from the scrubbing zone may be partially burned to sulfur dioxide which is then reacted with the remaining hydrogen sulfide to form elemental sulfur which is returned to reaction zone 1. The remainder can be oxidized to sulfuric acid for recycle to the hydrolysis.

The following example illustrates in detail the manner in which a moderately difficultly-oxidizable hydrocarbon is oxidized pursuant to the invention.

Example 225 g. of mixed meta- and para-xylene, 34 g. of sulfur, 464 g. of ammonium sulfate, and 960 cc. of water were charged to a 2.5 liter autoclave. The xylene mixture contained meta- and para-xylenes in the ratio of 85:15. The xylene mixture contained small amounts of ethyl benzene and paraffins aggregating about 5% by weight of the xylene mixture. The autoclave was sealed and heated to 620° F. It was maintained at that temperature and constantly shaken for a period of one hour. At the end of one hour the autoclave was cooled and depressured. During depressuring, hydrogen sulfide and a small amount of ammonia flowed from the autoclave. If the mixture is depressured before cooling, a much larger quantity of ammonia flows from the mixture and the amide and salt content of the product is lower. The non-gaseous reaction product was removed from the autoclave and steam stripped until the pH reached a value of about 6. The product was then given a decolorizing treatment with 1 g. of adsorbent charcoal and filtered. The filtrate was acidified to pH 2 with sulfuric acid to precipitate organic acids and organic acid amides. The resultant slurry was filtered, the filter cake was reslurried with water, refiltered, and dried. The final dry cake weighed 311.6 g. The material had a neutral equivalent of 104 and a saponification equivalent of 80.8. The solid product consisted of a mixture of isophthalic acid, terephthalic acid, isophthalic acid amides and terephthalic acid amides.

A number of other organic compounds were oxidized with ammonium sulfate, water and sulfur pursuant to the above example. In the following table the organic compound oxidized, the temperature of the oxidation reaction, and the oxidation reaction products obtained are summarized.

| Organic Compound | Temperature, ° F. | Reaction Product [1] |
| --- | --- | --- |
| Acetophenone | 600 | Benzoic acid. |
| Benzyl alcohol | 600 | Do. |
| n-Butane | 550 | Acetic acid, $CO_2$. |
| n-Butanol | 550 | $C_2$-$C_4$ Aliphatic acids. |
| Cumene | 575 | Benzoic acid. |
| Cyclohexanone | 525 | Phenol, $CO_2$. |
| meta-Cymene | 600 | Isophthalic acid. |
| 2,3-dimethyl Butane | 600 | $CO_2$, lower aliphatic acids. |
| Di-isobutylene | 550 | Pivalic acid. |
| Dodecene (propylene polymer) | 580 | Lower aliphatic acids. |
| Ethylene | 600 | Acetic acid. |
| Hemimellitene | 620 | Phthalic acids. |
| n-Hexane | 590 | $CO_2$, lower aliphatic acids. |
| Mesitylene | 625 | Trimesic acid. |
| Sucrose | 580 | Acetic acid. |
| Tetrahydrofurfural alcohol | 600 | Glutaric acid. |
| Toluene | 625 | Benzoic acid. |
| Ammonium Toluate | 600 | Terephthalic acid. |
| Propylene | 600 | Propionic and acetic acids. |

[1] The acids were largely in the form of amides and salts in the crude reaction products. Free acids were obtained by hydrolysis of the crude product.

Obviously many modifications and variations of the invention as hereinbefore set forth may be made without departing from the spirit and scope thereof, and only such limitations should be imposed as are indicated in the appended claims.

I claim:

1. A process for oxidizing organic compounds containing at least one carbon-to-hydrogen bond and at least one carbon-to-carbon bond which comprises heating the organic compound with a water-soluble sulfate, sulfur and water to an elevated temperature above 400° F. and below the critical temperature of water under a superatmospheric pressure sufficient to maintain a part of the water in liquid phase, the mole ratio of sulfate to organic compound being in excess of 1:1 and the mole ratio of organic compound to sulfur being at least about 2:1.

2. A process for oxidizing organic compounds having at least one carbon-to-hydrogen bond and at least one carbon-to-carbon bond which comprises contacting the organic compound with ammonium sulfate, water and sulfur at a temperature in the range 450 to 700° F. and under a superatmospheric pressure sufficient to maintain a part of the water in liquid phase, the mole ratio of sulfate to organic compound being in excess of 1:1 and the mole ratio of organic compound to sulfur being at least about 2:1.

3. The method as defined in claim 2, wherein the organic compound is a hydrocarbon.

4. A process for oxidizing alkyl aromatic hydrocarbons which comprises contacting the hydrocarbon with a water-soluble sulfate, water and sulfur at a temperature in the range 500 to 650° F. and under a superatmospheric pressure sufficient to maintain a part of the water in liquid phase, the mole ratio of sulfate to hydrocarbon being in excess of 1:1 and the mole ratio of hydrocarbon to sulfur being at least about 2:1.

5. The method as defined in claim 4, wherein the aromatic hydrocarbon is a xylene.

6. The method as defined in claim 1, wherein the organic compound is a paraffinic hydrocarbon.

7. The method as defined in claim 1, wherein the organic compound is an olefinic hydrocarbon.

8. A process for oxidizing oxygen-containing partially-oxidized hydrocarbons which comprises contacting the partially-oxidized hydrocarbon with ammonium sulfate, water and sulfur at a temperature in the range 450 to 650° F. under a superatmospheric pressure sufficient to maintain a part of the water in liquid phase, the mole ratio of sulfate to partially oxidized hydrocarbon being in excess of 1:1 and the mole ratio of partially oxidized hydrocarbon to sulfur being at least about 2:1.

9. The method as defined in claim 8, wherein the partially-oxidized hydrocarbon is an alkyl benzene carboxylic acid.

10. The method as defined in claim 8, wherein the partially-oxidized hydrocarbon is a toluic acid.

11. A process for oxidizing organic compounds having at least one carbon-to-hydrogen bond and at least one carbon-to-carbon bond which comprises contacting the organic compound with ammonium sulfate, water and sulfur in a reaction zone at a temperature above 400° F. and below the critical temperature of water and under a superatmospheric pressure sufficient to maintain a part of the water in liquid phase, the mole ratio of sulfate to organic compound being in excess of 1:1 and the mole ratio of organic compound to sulfur being at least about 2:1, cooling the reaction product mixture and separating a gaseous product comprising ammonia and hydrogen sulfide and a liquid product comprising an oxidized organic compound, scrubbing the gaseous product with sulfuric acid to separate ammonia from hydrogen sulfide, forming ammonium sulfate and returning at least a portion of the ammonium sulfate to the reaction zone.

References Cited in the file of this patent

UNITED STATES PATENTS

| | | |
| --- | --- | --- |
| 2,459,706 | King | Jan. 18, 1949 |
| 2,587,666 | Toland | Mar. 4, 1952 |
| 2,610,980 | Naylor et al. | Sept. 16, 1952 |

OTHER REFERENCES

Adams et al.: "Org. Reactions," vol. III, pages 84–98 (1946.)

Pattison et al.: J. Am. Chem. Soc., vol. 68, pp. 2033–5 (1946.)

Goldenberg et al.: Chem. Abstracts, vol. 44, col. 8073 (1950.)